United States Patent
Spranger et al.

(10) Patent No.: US 10,696,327 B2
(45) Date of Patent: Jun. 30, 2020

(54) ELECTRONIC PRESSURE LIMITING FOR DUAL PATH SYSTEMS

(71) Applicant: DANFOSS POWER SOLUTIONS INC., Ames, IA (US)

(72) Inventors: Brian E. Spranger, Nordborg (DK); Caleb Van De Stroet, Nordborg (DK)

(73) Assignee: DANFOSS POWER SOLUTIONS INC., Ames, IA (US)

(*) Notice: Subject to any disclaimer, the term of this patent is extended or adjusted under 35 U.S.C. 154(b) by 0 days.

(21) Appl. No.: 16/171,531

(22) Filed: Oct. 26, 2018

(65) Prior Publication Data

US 2020/0130742 A1    Apr. 30, 2020

(51) Int. Cl.
  *B62D 11/00* (2006.01)
  *F16H 61/431* (2010.01)
  *F16H 61/438* (2010.01)

(52) U.S. Cl.
  CPC ......... *B62D 11/005* (2013.01); *F16H 61/431* (2013.01); *F16H 61/438* (2013.01)

(58) Field of Classification Search
  CPC .... B62D 11/005; F16H 61/431; F16H 61/438
  USPC .......................................................... 701/41
  See application file for complete search history.

(56) References Cited

U.S. PATENT DOCUMENTS

| | | | | |
|---|---|---|---|---|
| 4,175,628 A | * | 11/1979 | Cornell | B62D 11/183 180/333 |
| 5,761,627 A | * | 6/1998 | Seidel | B62D 5/065 701/41 |
| 6,408,977 B1 | * | 6/2002 | Obertrifter | B62D 1/22 180/417 |
| 7,155,907 B2 | * | 1/2007 | Desjardins | F16D 31/02 60/329 |
| 2008/0128189 A1 | * | 6/2008 | Pruitt | B62D 11/001 180/197 |
| 2009/0229261 A1 | * | 9/2009 | Lin | F15B 21/082 60/422 |

* cited by examiner

Primary Examiner — Yazan A Soofi
(74) Attorney, Agent, or Firm — Zarley Law Firm, P.L.C.

(57) ABSTRACT

A pressure limiting system for a dual path machine wherein an input propel command from a propel device is scaled based upon the largest detected pressure in a hydraulic system to determine a modified propel command. Also, response time is adjusted within an electrical control system based upon the type of input propel command signal received.

9 Claims, 2 Drawing Sheets

ELECTRONIC PRESSURE LIMITING FOR DUAL PATH SYSTEMS

BACKGROUND OF THE INVENTION

This invention is directed to electronic pressure limiting and pressure compensated overrides, and more particularly, does so with a dual path machine.

Presently, dual path machines do not use pressure limiter (PL) or pressure compensated override (PCOR) hardware. The primary reason is that the dual path system interferes with the steering of the machine. As a result of not using PL or PCOR hardware, a substantial amount of heat can be generated in a very short period of time. To address this problem, a large cooling package is needed to account for the heat and the overall efficiency of the system is reduced.

Also, due to the high heat, component life is reduced.

An additional problem is that dual path machines can be very difficult to steer, particularly when the machine is travelling at a high rate of speed and the motor displacement is low. This is because the torque output on a motor is functionally limited and cannot turn the machine fast enough. As a result, there is a large steering delay that leads to machine uncontrollability. Because of this, to minimize the problem, manufacturers limit the top speed of their machine. Accordingly, a method and system is needed to address these problems.

An objective of this invention is to provide a pressure limiting system for a dual path machine having a reduced steering delay time to improve machine controllability at top speeds as well as operator confidence.

Another objective of the present invention is to provide a pressure limiting system for a dual path machine that increases efficiency and component life and reduces the required cooling package size.

A still further objective of the present invention is to provide a pressure limiting system that improves power management for high power situations and improved tractive effort for high pressure and speed situations.

These and other objectives will be apparent to those having ordinary skill in the art based upon the following written description, drawings and claims.

SUMMARY OF THE INVENTION

A system and method of electronically limiting pressure and providing pressure sensitive overrides for a dual path system includes a hydraulic system and an electronic control system. The hydraulic control system includes a pair of pumps in fluid communication with a pair of motors via a fluid conduit. The motors are operatively connected to and drive the dual path machine. A plurality of pressure sensors connect within the hydraulic system to sense pressure. Also, the hydraulic system has a plurality of electro hydraulic valves which are in fluid communication with actuators attached to the pumps.

The electronic control system includes a computer having a processor, memory, software, display and an input device. The computer is connected to the pressure sensors, the electro hydraulic valves, and a propel device. The propel device transmits steering and speed information to the computer and the sensors transmit pressure information. The computer scales the steering and speed information to determine a modified propel command. The modified propel command is transmitted by the control system to control the speed and direction of the machine.

DETAILED DESCRIPTION OF THE PREFERRED EMBODIMENTS

Figure 1:
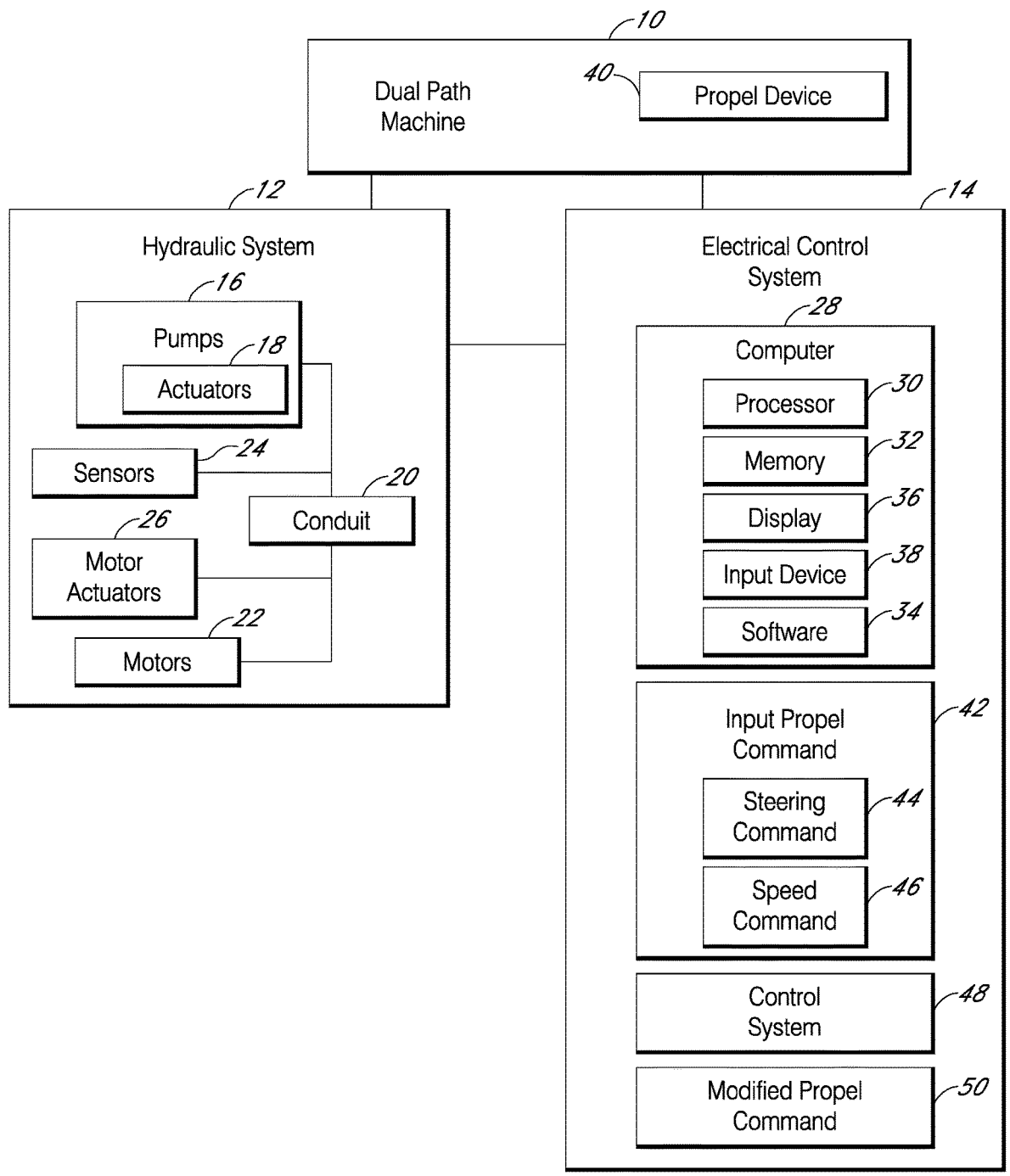
FIG. 1 is a schematic view of a pressure limiting system for a dual path machine.
Figure 2:
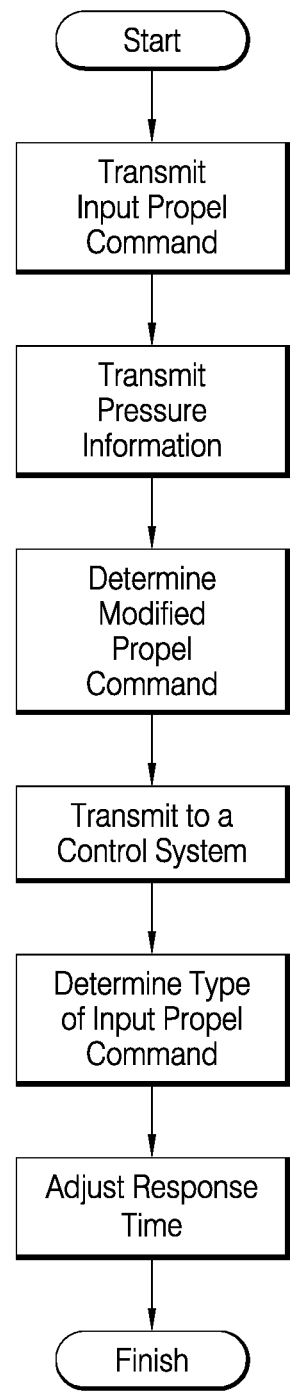
FIG. 2 is a flow diagram of a method of limiting pressure in a dual path machine.

Referring to the Figures, a method and system of electronically limiting pressure and providing pressure compensated overrides for dual path machines 10 includes a hydraulic system 12 and an electrical control system 14. The hydraulic system 12 generally includes a pair of pumps 16 having pump actuators 18 in fluid communication via fluid conduits 20 with a pair of motors 22. The motors 22 are operatively connected to and drive the dual path machine 10. The hydraulic system 12 also has a plurality of sensors 24 that sense pressure in the system 12 and motor actuators 26 which are in fluid communication with the pump actuators 18 to vary speed ratios and the direction of operation of the machine 10.

The electrical control system 14 includes a computer 28 having a processor 30, memory 32, software 34, a display 36, and an input device 38. A propel device 40, used to steer and control the speed of the dual path machine 10, is connected to the computer 28. The propel device 40, based upon manual operation, provides an input propel command 42 to the computer 28. The input propel command 42 includes a steering command 44 and/or a speed command 46. Also connected to the computer 28 are the pressure sensors 24 the pump actuators 18, and the motor actuators 26 through a control system 48.

In operation, an input propel command 42 and signals from sensors 24 are sent to the computer 28. Using the software 34, the processor 30 scales the input propel command 42 according to the largest pressure sensor 24 feedback signal to determine a modified propel command 50. For example, as shown in the table below, as the pressure increases, the input control command 42 is reduced.

| Pressure | Modified In |
| --- | --- |
| 300 bar | IPC × 100% |
| 360 bar | IPC × 50% |
| 420 bar | IPC × 0% |

The control system 48 uses the scaling to control the machine. In one example the pressure limit scaling is applied in conjunction with a state brake which is used to control the machine acceleration states.

The modified propel command 50 is output from the control system 48 and commanded to the pump actuators 18 and the motor actuators 26. This varies the fluid flow to vary the speed ratios and the travel rate of the machine 10.

When scaling the input propel command 42 the software 34 also distinguishes between whether the input propel command 42 is a steering command 44 or a speed command 46. Based upon this distinction, the response time of the pressure limit is increased or decreased based upon the type of situation the machine encounters.

For example, if the machine 10 is being steered, the pressure limit needs to respond very quickly to increase the motor torque and reduce steering delay. If the machine 10 is climbing a long gradual hill, the pressure limit needs to respond slowly to reduce oscillations and overshoots. The response rates are adjusted by control system 48 by changing the acceleration and deceleration rates depending on the machine state such as propel command, pressure input, and the like.

Accordingly, a method and system for limiting pressure and providing pressure compensated overrides for dual path machines 10 has been disclosed that, at the very least, meets all the stated objectives.

From the above discussion and accompanying figures and claims it will be appreciated that the dual path machine 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A method of electronically limiting pressure and providing pressure sensitive overrides for a dual path machine, comprising the steps of:
    transmitting an input propel command from a propel device to a computer of an electronic control system;
    transmitting signals from pressure sensors from a hydraulic system;
    determining a modified propel command using a processor and software from the computer by scaling the input propel command based upon the largest pressure sensor signal received; and
    adjusting an actuator on a pump based upon the modified propel command; and
    determining a type of the input propel command and adjusting a response time of the hydraulic system based on the determination;
    wherein response time is decreased when the input propel command is determined to be a speed command.

2. The method of claim 1 wherein electronic hydraulic valves are connected to the actuators and are adapted to vary speed ratios and direction of operation on the pump.

3. The method of claim 1 wherein the input control command includes a steering command and a speed command.

4. The method of claim 1 wherein the step of scaling is applied in conjunction with a control system.

5. The method of claim 1 wherein output from the computer is commanded to pump actuators and motors.

6. The method of claim 1 further comprising the step of determining whether the input propel command is a steering command or a speed command.

7. The method of claim 6 wherein response time is increased when the input propel command is determined to be a steering command.

8. A method of electronically limiting pressure and providing pressure sensitive overrides for a dual path machine, comprising the steps of:
    transmitting an input propel command from a propel device to a computer of an electronic control system, wherein the input control command includes a steering command and a speed command;
    transmitting signals from pressure sensors from a hydraulic system;
    determining a modified propel command using a processor and software from the computer;
    adjusting an actuator on a pump based upon the modified propel command; and
    determining whether the input propel command is a steering command or a speed command.

9. A method of electronically limiting pressure and providing pressure sensitive overrides for a dual path machine, comprising the steps of:
    transmitting an input propel command from a propel device to a computer of an electronic control system;
    transmitting signals from pressure sensors from a hydraulic system;
    determining a modified propel command using a processor and software from the computer;
    adjusting an actuator on a pump based upon the modified propel command; and
    determining whether the input propel command is a steering command or a speed command and adjusting response time of the hydraulic system based on the determination.

* * * * *